INVENTOR
Ralph Cover
BY
Cushman, Darby & Cushman
ATTORNEYS

INVENTOR
Ralph Cover

March 24, 1959 R. COVER 2,878,847
MILL FOR GRINDING GREEN CORN
Filed Feb. 18, 1955 9 Sheets-Sheet 9
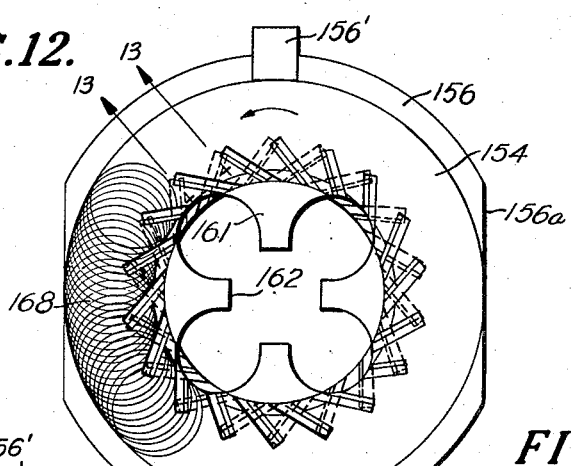
FIG.12.
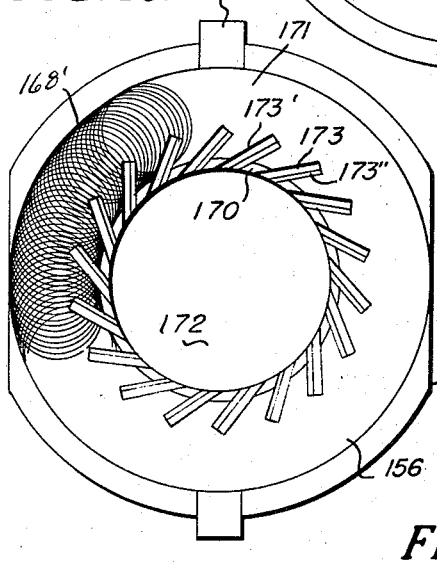
FIG.10.
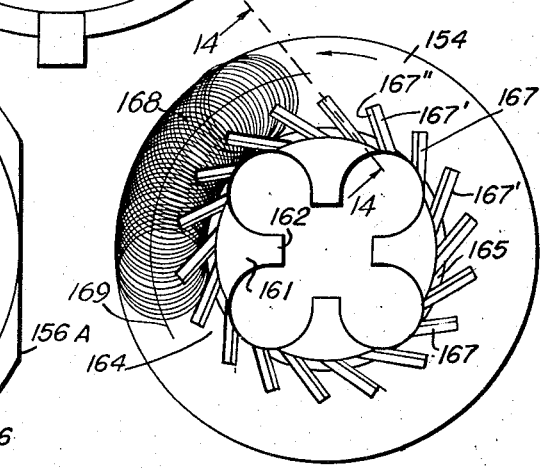
FIG.11.
FIG.13.
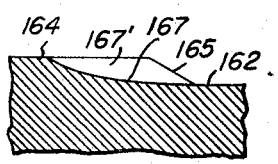
FIG.14.
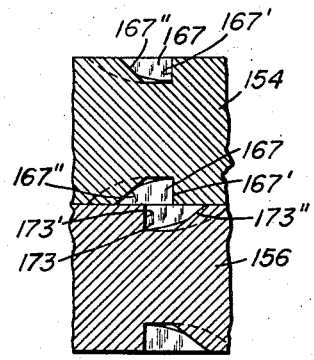
INVENTOR
Ralph Cover
BY
Cushman, Darby & Cushman
ATTORNEYS

United States Patent Office 2,878,847
Patented Mar. 24, 1959

2,878,847

MILL FOR GRINDING GREEN CORN

Ralph Cover, Westminster, Md.

Application February 18, 1955, Serial No. 489,236

14 Claims. (Cl. 146—182)

The present invention relates primarily, though not exclusively, to an improved apparatus for reducing, grinding, milling, and mixing vegetable materials in the fresh state and, more particularly, to the making of the fluid constituent of cream style corn. The treatment of such materials presents special and unusual problems, not encountered in the milling, grinding, or reducing of other materials, and procedures and equipment found satisfactory in other fields are entirely unsatisfactory and produce inferior results when employed in the preparation of a creamy liquid from fresh corn kernels.

The apparatus of the present invention is particularly adapted for use in producing the finely divided corn grain constituent or cream of the product described in and adapted to be employed in the process covered by United States Patents 2,484,375 and 2,484,376, Ralph Cover, October 11, 1949. The process described in said patents and the products resulting therefrom have created what may be termed a revolution in the corn canning industry, and reasonably satisfactory machines have been developed for producing the cream constituent of the product, but those machines left much to be desired from the commercial standpoint, with respect to their rate of production of the cream corn constituent, their sanitary characteristics, including ease of cleaning and sterilization, and the uniformity and excellence of the product.

The primary object of the present invention is to provide an improved apparatus, as compared to machines heretofore commercially used, for producing the cream constituent, from green corn kernels, of cream style canned corn and the like. To this end, the invention aims to provide a machine which will handle corn kernels containing a wide range of moisture content, such as from 65 to 75% and of a wide range of maturity.

Another object of the invention is to grind or comminute the green corn kernels substantially in the absence of air or oxygen, to prevent the deleterious effect thereof upon the corn, encountered in prior milling machines.

Another object is to reduce the corn or other product without substantially raising its temperature.

Still another object of the invention is to perform the reducing operation in a minimum of time and in such manner that all particles are treated uniformly and none subjected to greater or longer grinding or comminuting influences than others.

Another object is to provide a machine which operates on only a relatively small amount of the corn or other product at any one time, such as a couple of handfuls; in other words, to feed a relatively large volume of corn through the milling machine relatively rapidly and to treat only a small amount of this volume at any one instant for a short time.

Another and vitally important object of the invention, as applied to the reduction of fresh sweet corn kernels is to reduce, effectively and sufficiently, the pericarp or hull of the corn kernel which is composed of three thin layers of cellulose and which increases in toughness as maturity advances, without damaging the endosperm of the kernel, which is the main part or body thereof, surrounding the embryo or heart at the base of the kernel. The problem is to separate the layers of the pericarp and reduce them to the proper shape and size, without grinding the endosperm too finely. Such unduly fine grinding produces a granular condition in some cases or a gummy or oily condition in others, depending on the maturity of the corn being treated. Thus, the present invention aims to provide a machine which reduces the pericarp to fine slivers or pieces which are unobjectionable to the tongue or organoleptically, such as of a size equivalent to one-eighth inch square. The full pericarp content, when reduced to this size is a valuable adjunct to canned cream style corn as it serves as a stabilizer and prevents separation or break down in the can.

Another important object of the invention is to provide an apparatus wherein the reducing chamber is quite small and wherein the material being treated cannot adhere to the walls of the chamber and remain therein for any substantial period of time. In mills of the hammermill type, the reducing chamber is large and it is possible for substantial amounts of material to remain therein, while other material passes therethrough. Such material, adhering to the walls, deteriorates rapidly and adversely affects the quality of the material being treated and passing therethrough.

Another object of the invention is to provide a positive force feed for the mill, so that the material is tightly compacted before being treated, to exclude air and to effect the treatment substantially in the absence of oxygen. Another object of the invention is to provide positive cooling means in the apparatus to prevent a rise in the temperature of the milling parts or the passages through which the product passes.

Another object of the invention is to provide means for varying the pressure exerted on the material prior to its passage through the milling zone and to observe this pressure constantly, so that the optimum pressure at all stages may be employed at all times.

Another object of the invention is to subject the product, such as fresh green corn kernels, to the reducing action in a plurality of successive stages, the operations of which are each accurately controlled. To this end, the invention, in its preferred and more specific embodiment contemplates the use of a gear pump as the first reducing agency and as the pressure creating element to force the material through the grinding surfaces of a plurality of disk mills in parallel where another reducing action is quickly performed on the product and then through a second gear pump and a second set of disk mills in parallel where the final reducing action quickly takes place, all without any substantial rise in temperature, without any discoloration of the product, and without any opportunity for portions of the product to adhere to the walls of the milling chamber, the conduits, or the milling elements.

The invention also includes important specific improvements in certain details of construction of the rotor and stator disks in the mills.

Other and further objects and advantages of the invention, such as improved sanitary features, ease of assembly and disassembly, and the like, will be apparent from a consideration of the preferred embodiment of the invention, shown for purposes of illustration in the accompanying drawings and described below.

In the drawings,

Figure 10 is a face view of one of the stator plates of the milling heads;

Figure 11 is a similar view of one of the rotor plates;

Figure 12 is a view showing the rotor superimposed on the stator;

Figure 13 is a greatly enlarged fragmentary section on line 13—13 of Figure 12; and Figure 14 is a similar section on line 14—14 of Figure 11.

General organization

Figure 1:
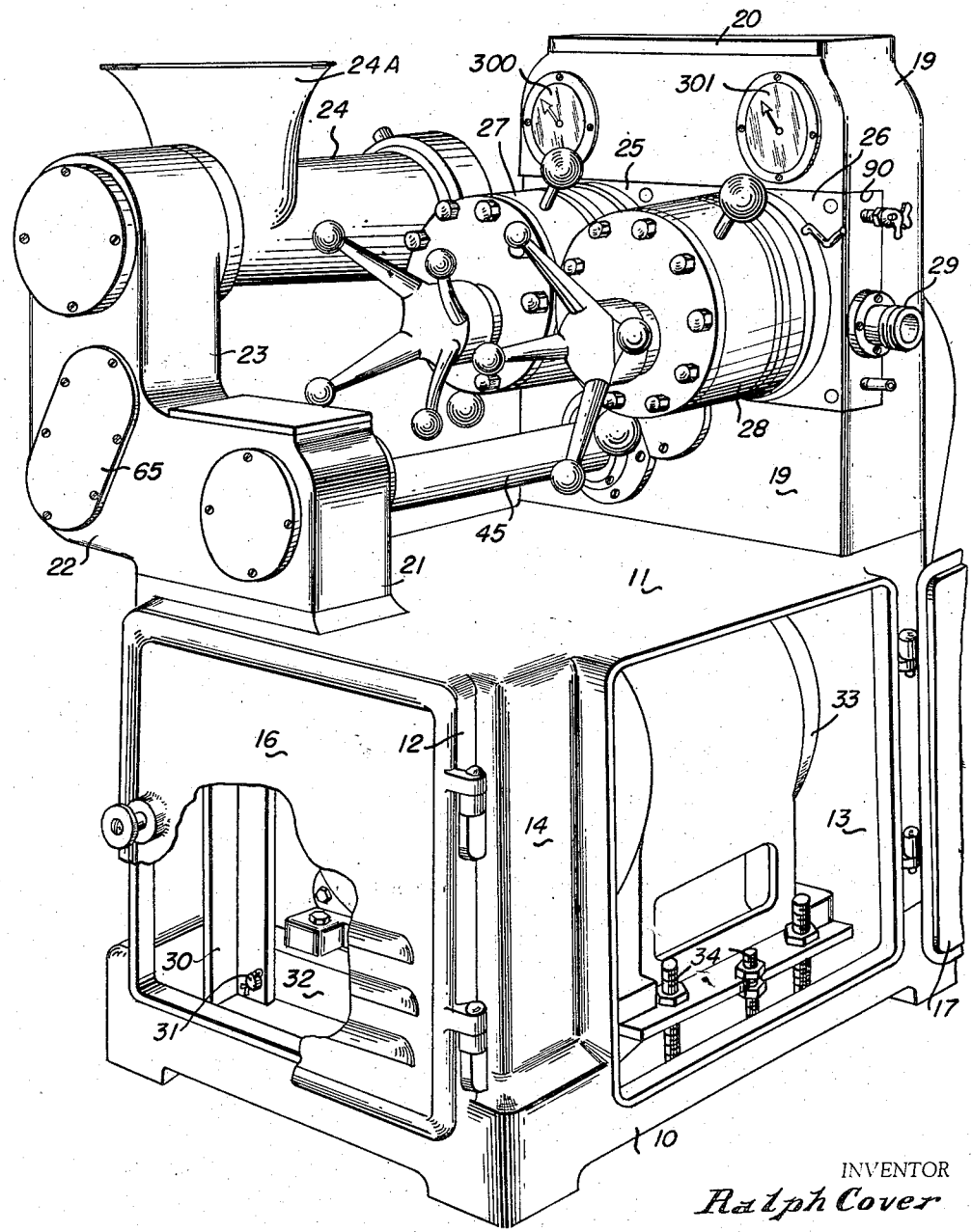
Figure 1 is a front perspective view of the apparatus.
Figure 2:
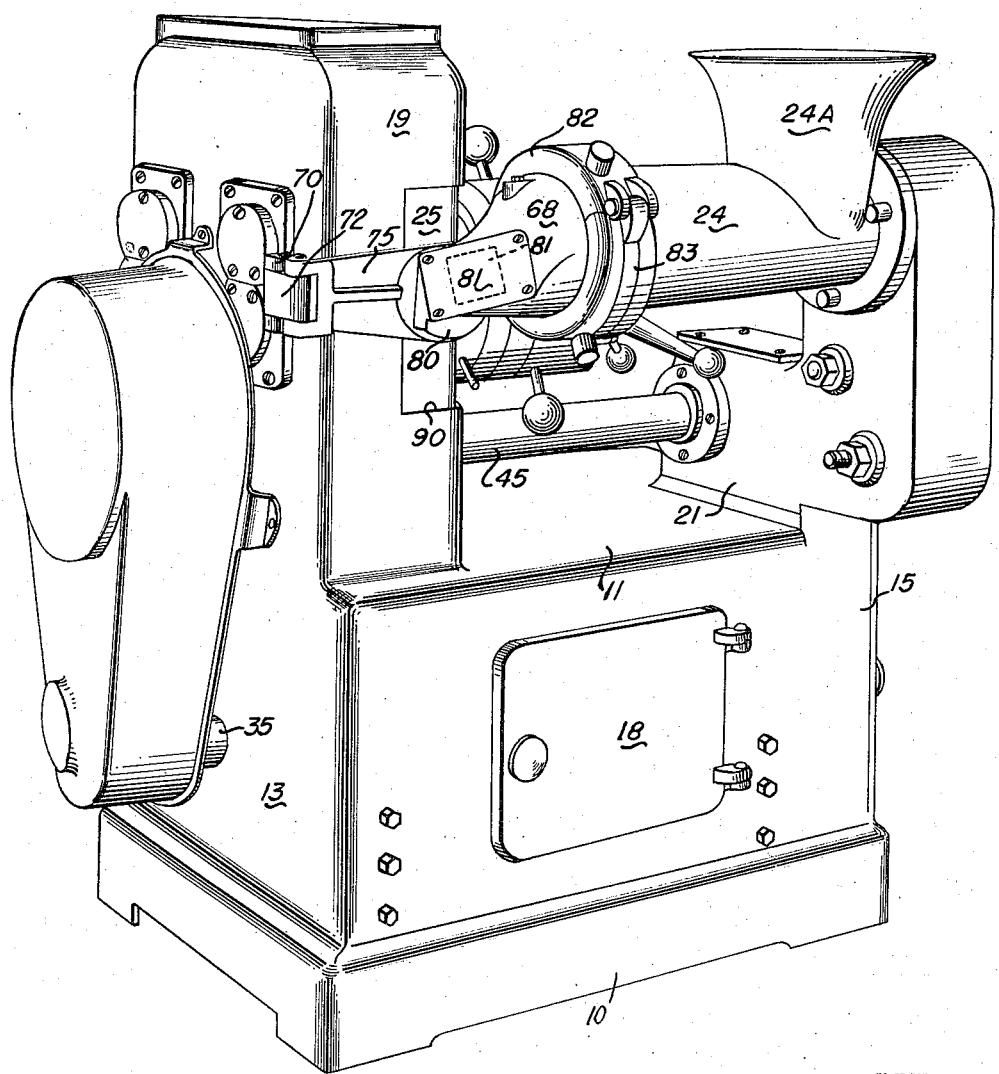
Figure 2 is a rear perspective, looking in substantially the opposite direction from Figure 1.

Referring to Figures 1 and 2, the machine of the present invention comprises, in general, a heavy unitary base casting 10, including a top 11, a front wall 12, a rear wall 13, a right hand side wall 14 and a left hand side wall 15. Heavy doors 16 and 17 are adapted to close enlarged openings in the front and right hand side walls, respectively, while a smaller door 18 is hingedly mounted adjacent a smaller opening in the left hand side wall.

Supported upon the rear portion of the top 11 is an upstanding gear casing 19, having its open upper end closed by a closure plate 20. Near the front of the top 11, there is a screw conveyor power transmission and supporting housing 21, including a laterally projecting portion 22 and an upwardly projecting portion 23. The latter carries the housing 24 of an infeed screw conveyor, adapted to deliver material to the mill proper.

Mounted in the front face of the gear casing 19 are a pair of back plate castings 25 and 26, to which the two milling heads, represented generally at 27 and 28 are secured. The outlet for the milled material is shown at 29 and is adapted to be connected to a discharge pipe or the like, to convey the material to the next point of treatment in the plant.

Machine drive

A pair of vertically disposed angle irons, secured to the left hand wall of the base 10, one of which is shown at 30 in Figure 1, pivotally support at 31, a platform 32 upon which an electric motor 33 is supported, the other edge of the platform being adjustably connected by a plurality of bolts 34 to a flange or angle element, not shown, carried by the lower portion of the base 10, below the large opening in side wall 14. Hence, the platform may be raised and lowered about the pivots 31, to tension the belts hereinafter referred to.

Figure 5:
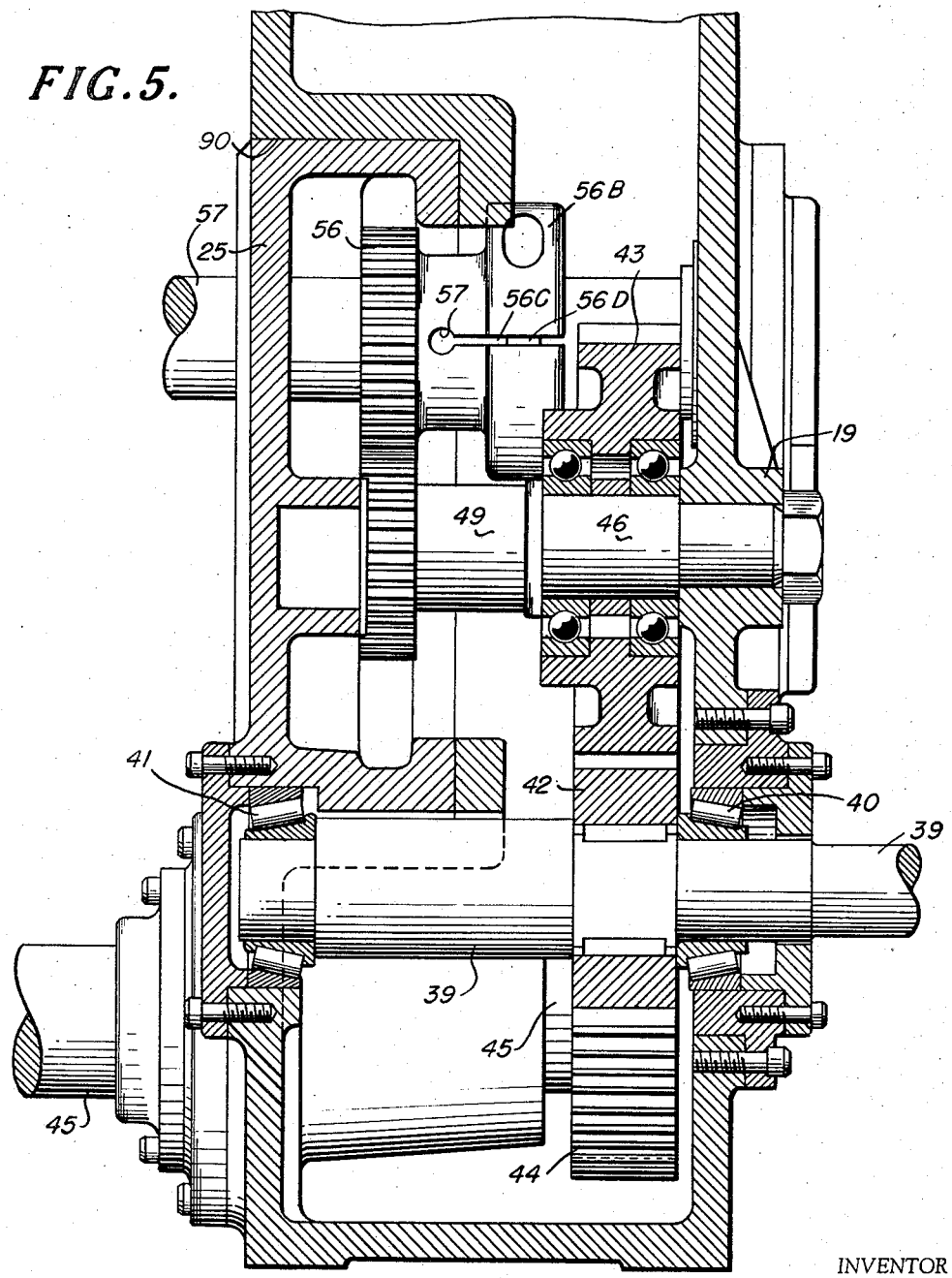
Figure 5 is an enlarged vertical section taken substantially on line 5—5 of Figure 3.

The motor shaft 35 (Figures 2 and 3) carries a multiple V-belt pulley 36, about which a set of six V-belts 37 are trained. An upper pulley 38, fast on a shaft 39, journalled in the gear case 19 accommodates the V-belts and is driven thereby. As shown in Figure 5, the shaft is supported by roller bearings 40 and 41 in accordance with good, conventional engineering practice. A spur gear 42, fast on the shaft 39 drives an upper, intermediate spur gear 43 and a lower gear 44, fast on a shaft 45 journalled in the gear casing and extending forwardly to the screw conveyor drive housing 21.

Figure 6:
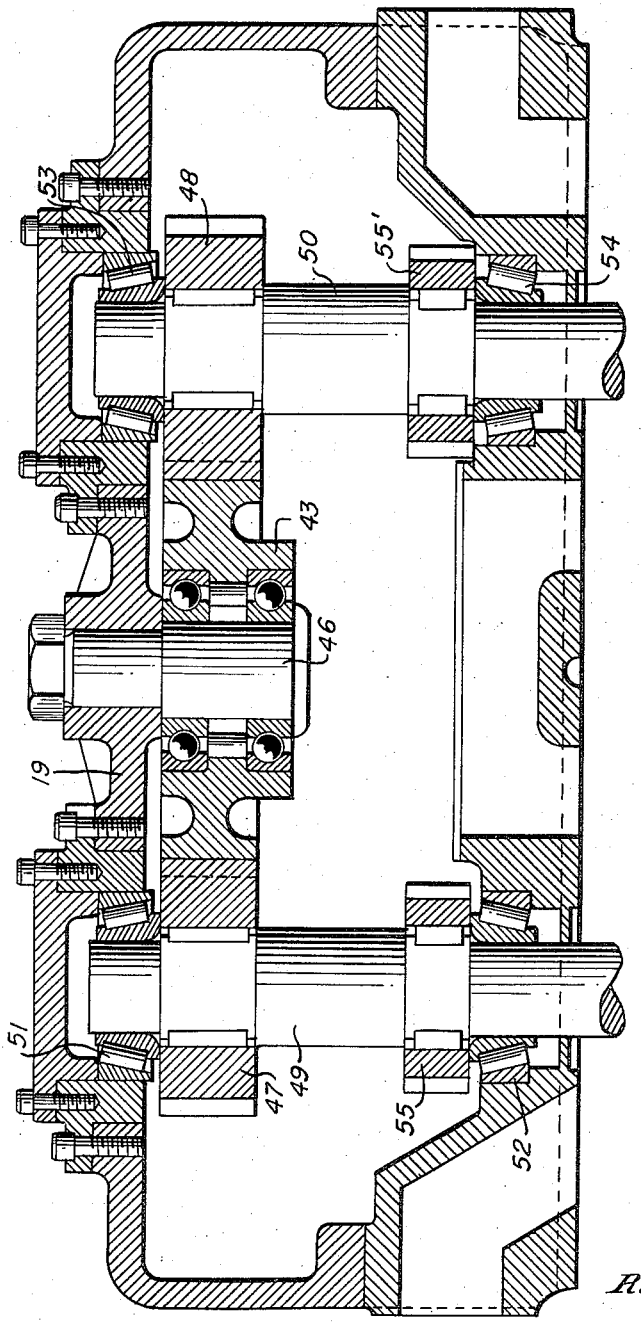
Figure 6 is a similar horizontal section, on line 6—6 of Figure 3.

The upper intermediate gear 43 is journalled upon a stationary stub shaft 46 carried by the back wall of the gear casing 19 as shown in Figures 5 and 6. Referring to the latter figure, this upper intermediate gear 43 is in mesh with two spur gears 47 and 48, non-rotatably secured, respectively, on milling head drive shafts 49 and 50. The shaft 49 is journalled by roller bearing assemblies 51 and 52, in accordance with good conventional engineering practice, in the front and rear walls of the gear casing 19, while the shaft 50 is similarly mounted in bearing assemblies 53 and 54.

Figure 8:
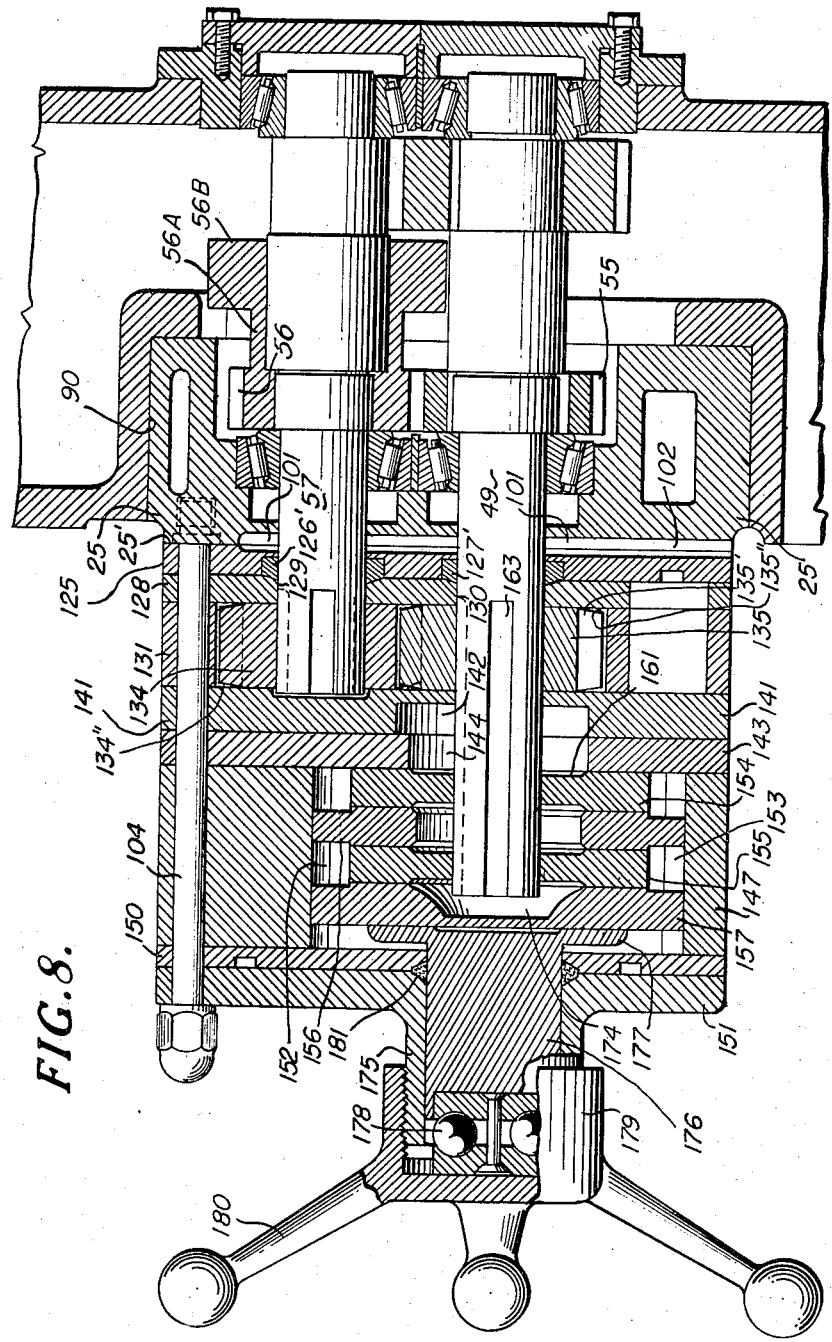
Figure 8 is a vertical longitudinal sectional view of the left hand milling head shown in perspective in Figure 1.
Figure 9:
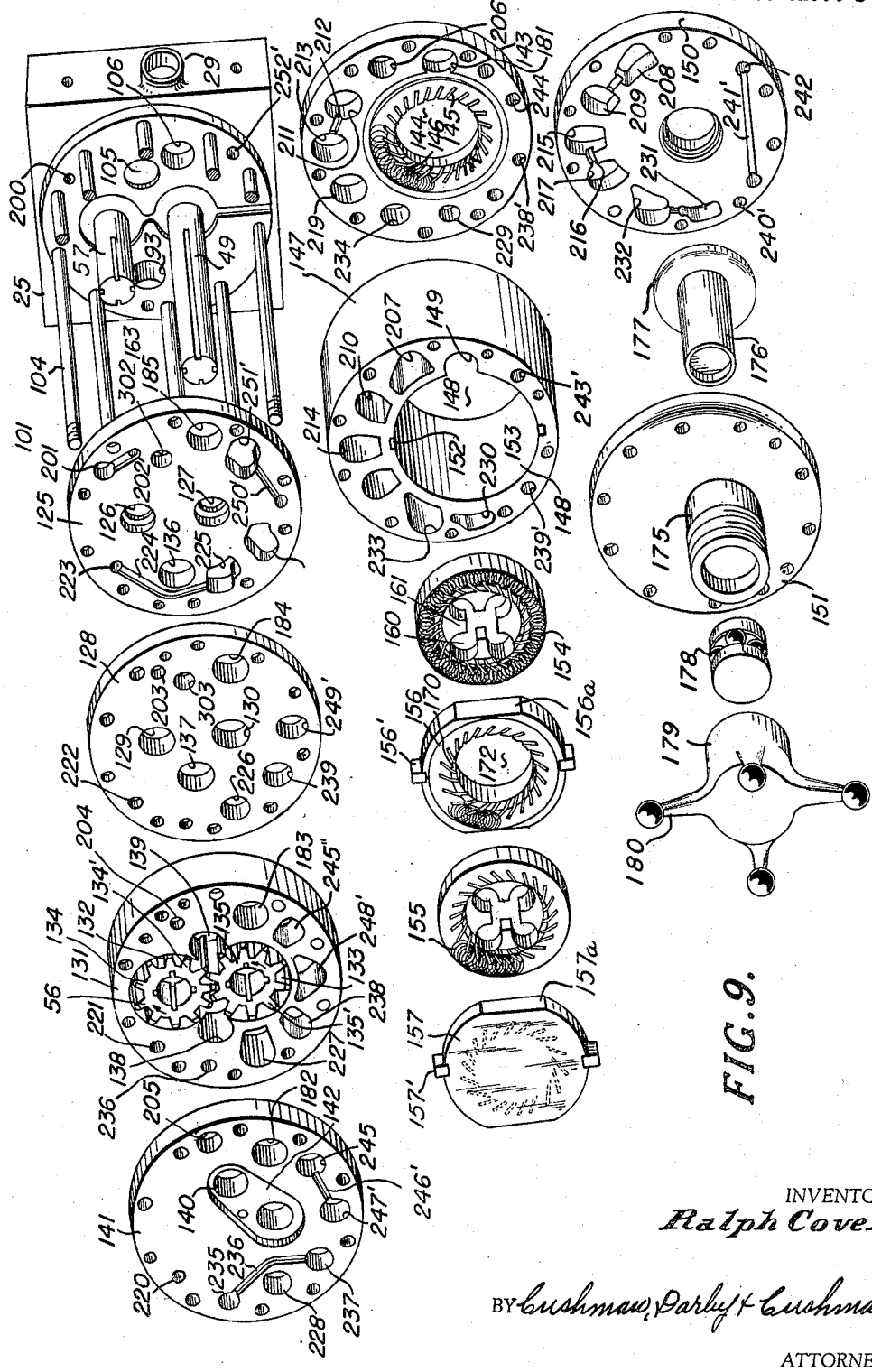
Figure 9 is an exploded, perspective view of the left hand back plate casting and the component parts of the infeed pump and milling head.

The milling head drive shafts 49 and 50 have keyed thereto second spur gears 55 and 55' in mesh with gears fast on upper gear pump shafts 57, one of which spur gears is shown at 56 in Figures 8 and 9.

Figure 3:
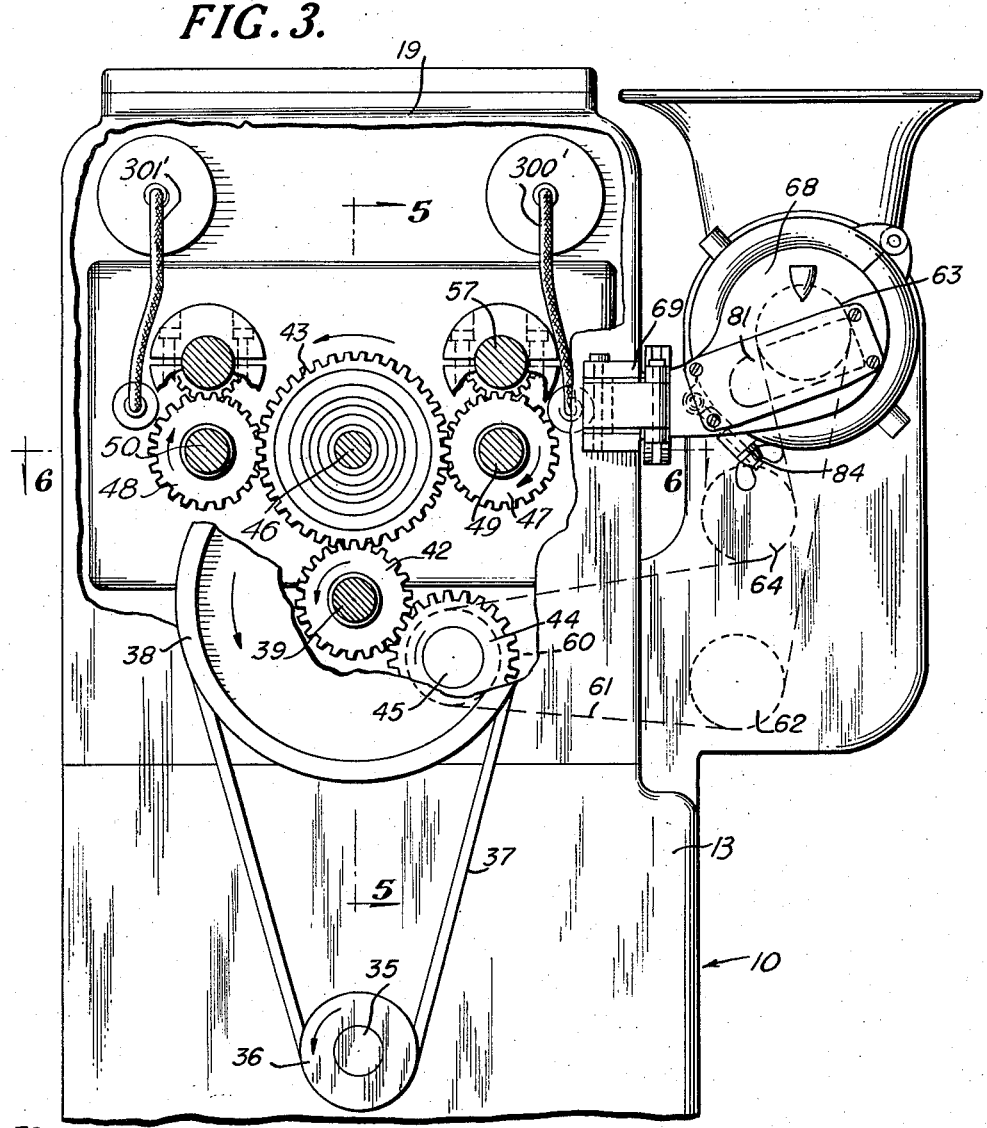
Figure 3 is a fragmentary rear elevation with certain parts broken away for the sake of clarity.

Referring to Figures 1, 2 and 3, the shaft 45 which is the driving element for the transmission leading to the infeed screw in the conveyor housing 24, as stated above, is journalled at its forward end in the transmission housing 21. This end of the shaft carries a sprocket indicated diagrammatically at 60 in Figure 3, about which a driving chain 61 is trained. The lower run of this chain travels about a lower idler sprocket 62 and then extends upwardly where it is trained about a sprocket 63 on the shaft of a conventional worm or screw conveyor disposed within the feeder housing 24 but not shown in detail in the accompanying drawings, since the construction is conventional and may be purchased on the market. The upper run of the chain 62 passes under an adjustably mounted idler sprocket 64, to which access may be had through an appropriate opening, by removing a closure plate 65 (Figure 1). Thus, the worm or screw associated with the feeder is rotated by the electric motor 33, through the gears referred to above, the shaft 45 and the chain 61, to deliver corn or other material deposited in the hopper 24a to and through the delivery spout 68.

Delivery of material to machine

Figure 4:
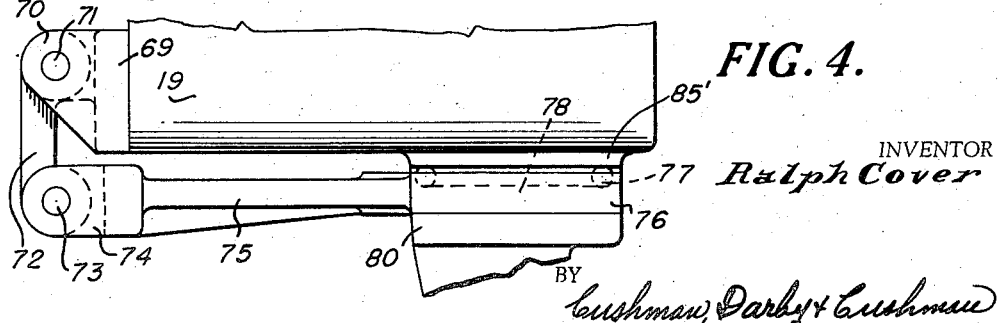
Figure 4 is a fragmentary plan view on an enlarged scale, of a preferred form of hinged connection between the screw feeder and the mill proper.

The delivery spout 68 is of special construction and is arranged and mounted to facilitate ready disassembly, cleaning and reassembling. As best shown in Figure 4, the back face of the gear housing 19 carries a bracket 69 having a pair of rearwardly projecting apertured lugs 70 thereon, carrying a pin 71, to which a link 72 is pivoted. The other end of the link is similarly connected by a pin 73 to the bifurcated end 74 of an arm 75 having at its other end an annular portion 76, provided with an annular recess in which an O-ring 77 is positioned in encircling relation to the central opening 78.

The spout 68 comprises a casting having a laterally turned lower rear end 80 secured to and carried by the annular portion 76 of the supporting arm or bracket 75 and having its throat in registry with the opening 78. A plate 81 covering an opening in the throat 80 carries an electro-magnet 81' adapted to attract and catch tramp metal which might otherwise enter the machine and damage the pump elements or the milling discs. The upper, enlarged, outwardly flaring portion of the throat 68 is outwardly flanged and is embraced by a split collar comprising an upper half 82 and a lower half 83, adapted to engage in clamping relation the last mentioned flange and a similar flange on the discharge end of the housing 24 of the screw conveyor, to draw the spout and the housing tightly into engagement and to hold the parts in that relation. The split ring is maintained in closed position by a pivoted bolt and wing nut assembly of known construction, indicated generally at 84 in Figure 3.

The left hand end face of the left hand back plate casting 25 (Figures 4 and 7) is provided with an outwardly projecting annular boss 85 having a plain outer surface against which the O-ring 77 is adapted to seat, in hermetrically sealed relation, when the spout 68 is firmly clamped upon the housing 24 of the infeed conveyor as described above. When the split ring assembly is opened, the spout and the arm or bracket 75 may be swung rearwardly for inspection and cleaning.

Force feed to mills

Figure 7:
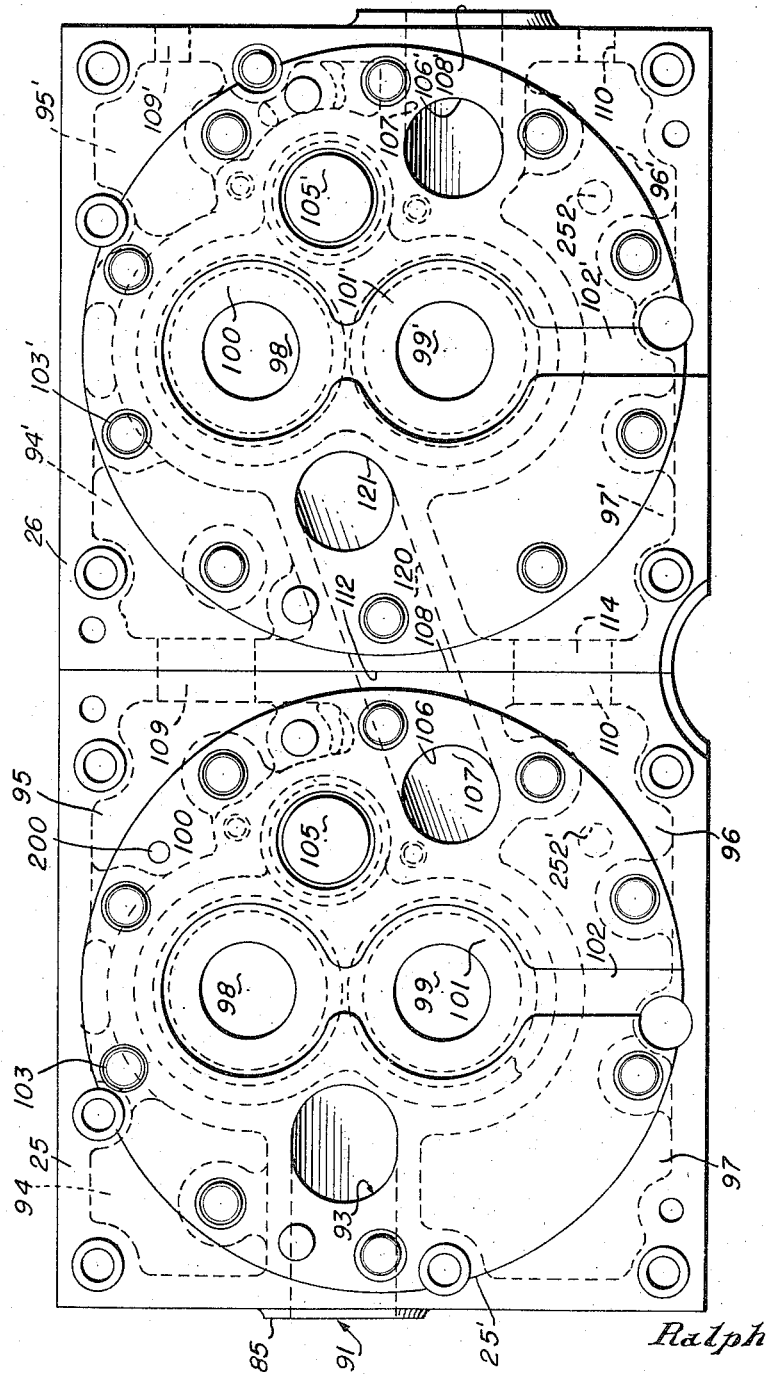
Figure 7 is an elevational view of a pair of connected back plate castings, to which the milling heads are adapted to be secured.

The back plate castings 25 and 26 are mounted in a transversely extending recess 90 formed in the front face of the upwardly projecting gear housing 19. The annular boss 85, as best shown in Figure 7, surrounds an inlet passage 91 formed in the casting 25 and having its other end opening through the front face as indicated at 93. The casting is cored at 94 and 95 to provide intercommunicating water jacket spaces adjacent the upper half thereof, and at 96 and 97 to provide similar passages or spaces at the lower portion thereof. Additionally, the casting is provided with upper and lower bores 98 and 99, through which the shafts 57 and 49 extend, the bores being formed in inwardly recessed portions 100, 101, communicating with a downwardly extending groove 102 for purposes hereinafter explained. A plurality of tapped holes 103 are formed in the casting around the circumference of the raised, forwardly projecting, circular central portion 25' thereof, to receive a plurality of forwardly projecting rods 104 (Figures 8 and 9). Another circular opening 105 is formed in the face of the back plate casting, to receive a pressure gauge diaphragm or bellows, to measure the pressure of the material entering the mill, as hereinafter explained. Finally, the back plate casting 25 is provided with an opening 106, leading to a discharge passage 107 terminating in an opening 108 in the right hand side face of the back plate casting. This side face is also provided with openings 109 and 110 communicating with the water jacket spaces 95 and 96, respectively.

The right hand back plate casting 26 is generally similar to the left hand one and serves as the support for the right hand milling head 28. Its left hand vertical side face includes an opening 112 in registry with the opening 108 in the right hand side face of casting 25, and additional water circulating openings 113, 114 registering with the openings 109, 110, respectively, so that water may circulate freely through the water jacket spaces 94', 95', 96', and 97', corresponding generally with jacket spaces 94—97 in the first back plate.

The opening 112, in registry with the discharge opening 108, leads to an inlet passage 120, communicating through the face of the back plate casting 26 in an opening 121, generally similar to the opening 93 in the other back plate casting.

Additionally, the casting 26 is provided with upper and lower bores 98' and 99', through which an upper gear pump shaft 57 and the lower shaft 50 extend, the bores being formed in inwardly recessed portions 100', 101', communicating with a downwardly extending groove 102' for purposes hereinafter explained. Tapped holes 103' are provided for the same purpose as holes 103 in the back plate casting 25 and an opening 105' is provided, to receive a pressured gauge diaphragm or bellows, to measure the pressure of the material at this point in its passage through the apparatus. A discharge opening 106' is positioned in the same relative location as the opening 106, and communicates with a discharge passage 107', terminating in an opening 108' in the right hand side face of the casting.

In addition, the right hand side face of the casting 26 has a pair of tapped openings 109' and 110', to which cooling water conduits may be connected for the introduction, circulation and discharge of fluid through the water jacket spaces or cored-out areas in the back plates.

The two milling heads 27 and 28 are substantially identical in construction and are both force fed by positive displacement gear pumps, the arrangement being such that material is delivered from the screw conveyor through the opening 93 in back plate 25 to the first gear pump and from the latter through the milling discs in the first milling head 27. From this head the material is delivered through opening 106, passage 107 and discharge charge opening 108 of back plate 25 to the inlet opening 112, inlet passage 120 and opening 121 of back plate casting 26, into the inlet of the second gear pump. The latter delivers the material to the milling discs of the second head, which perform the final reducing operation and return the same through opening 106', passage 107' to the final discharge opening 108'. Thus, the material is forcefully fed through the milling heads in series.

Since the gear pumps constituting the force feeding means are identical, a description of one will suffice. Referring to Figures 8 and 9, showing the left hand pump and milling head, it will be noted that a back sealing plate 125 supported on rods 104 is disposed in face-to-face contact with the forwardly projecting, raised portion 25' of the back plate 25. The plate has a pair of openings 126 and 127 through which the shafts 49 and 57 extend. Packing glands 126' (Figure 8) and 127' are disposed in sealing relation to the shafts, within the openings. Also mounted upon the rods 104 is a pump chamber back plate 128 having a pair of openings 129 and 130 through which the shafts 57 and 49 project. The rear edges of these openings are somewhat countersunk to receive forwardly projecting faces of the packing glands 126' and 127'.

Next in the series of plates supported upon rods 104 is the pump housing plate 131. This plate or casting is shaped to provide two intersecting cylindrical chambers 132 and 133, having their axes coinciding with the centers of openings 126 and 129 and 127 and 130 of the plates 125 and 128, and also aligned with the axes of shafts 57 and 49. Disposed within the upper chamber 132 and keyed upon the end of shaft 57 is a gear 134, having the teeth 134' thereof in mesh with similar teeth 135' of a gear 135, fast on the end of the lower shaft 49. Although the gears are in mesh with each other, in the sense that the teeth on one gear are received in the spaces between teeth of the other gear, they are not in driving relation, as the driving is effected through gears 55 and 56, fast on the shafts 49 and 57. The advantages of this arrangement are explained below.

Referring to Figure 9, registering with the inlet opening 93 in the back plate casting 26 are pump inlet openings 136 and 137 in plates 125 and 128 respectively. These openings register with a pump inlet chamber 138 in the pump housing 131. Formed in the gear pump housing plate 131 is a pump discharge chamber 139 which communicates forwardly with a pump delivery opening 140, in a pump chamber front plate 141, mounted on rods 104 and constituting the front wall of the pump chambers 132 and 133. The front surface of this plate 141 has a recess 142 therein, constituting the discharge passage leading downwardly from opening 140 to the central openings in the milling discs described below.

As pointed out above, the gears 134 and 135 of the positive displacement gear pump are so adjusted that the teeth thereof are not in driving relation to each other but are out of contact by a few thousandths of an inch. This adjustment is accomplished through the gear 56 on shaft 57, which is mounted thereon for circumferential adjustment. It is the driven gear of the pair, consisting of gears 55 and 56. As shown in Figures 5 and 8, it has a rearwardly extending sleeve portion 56a terminating rearwardly in an enlarged relatively heavy flange 56b, both of which are split, as indicated at 56c on diametrically opposite sides. Headed screws 56d interconnect the two semi-cylindrical bodies constituting the flange 56b so that the split extension of the gear may be tightly clamped upon the shaft in any desired position of angular adjustment, for instance, to maintain the pump gears out of contact with each other, while the gears 55 and 56 are in driving relation.

It has been found that gear pumps, working in cylinders with close tolerances and particularly when associated with shafts supported in bearings spaced from the pumping elements, tend to tip or cant slightly on their axes with the result that the corners of the teeth tend to dig or cut into the end walls of the cylinders, resulting in a sloppy fit, by-passing of the material and an inefficient pumping action. This difficulty in accordance with the present invention, has been overcome by beveling or slightly relieving the end faces of the teeth at the tips thereof. This relief may be in the range of a few thousandths of an inch and is shown, greatly exaggerated in Figure 8 at 135" and 134".

The gear pump develops substantial pressure but in the normal operation and with proper seals, no substantial leakage is to be anticipated. However, if the material being pumped should be forced inwardly and rearwardly along the shafts 49 and 57, and past the seals 126' and 127', it would be highly objectionable, if the material continued to flow along these shafts into the gear housing, shaft bearings and the like. This possibility is prevented in accordance with the present invention, by the recesses 100 and 101 and the channel 102 formed in the face of the back plate casting 25 similar mating recesses and channels formed in the rear face of the back sealing plate 125. Any material forced rearwardly along the shafts 57 and 49 is received in these recesses and is permitted to drain from the bottom of channel.

The disc mills

A first stator milling disc 143, has a plane rear face disposed in registry with the outer face of plate 141. It is provided with an enlarged cylindrical opening 144 arranged coaxially with respect to the lower shaft 49. This opening is in communication with the discharge passage 142 in the face of plate 141. On the outer face of plate 143, surrounding the opening 144 are a plurality of milling grooves 145, described in detail below and a plurality of smaller ribs and grooves or serrations as indicated generally at 146.

Also mounted on the rods 104 and disposed outwardly of the stator plate 143 is a casting constituting a mill housing plate or block 147 having a cylindrical interior 148. The latter opens laterally with an enlargement 149, acting as a material discharge passage as hereinafter explained. The milling chamber 148 is closed at its outer end by a sealing plate 150 also mounted on rods 104. Finally there is an outer cover plate 151 carried by rods 104, with certain adjuncts and features described below.

The cylindrical side wall of the chamber 148 is also provided with upper and lower key ways 152, 153, respectively, to retain the floating stator plates in position, as hereinafter explained.

Splined upon the lower shaft 49 for rotation therewith, and with capability for axial adjustment, are a pair of spaced rotor milling discs 154 and 155. Interposed between them is a floating stator plate 156 and, at the outer end of rotor 155 is a floating end stator disc 157.

Disc mill rotors 155 and 154 are substantially identical and include (Figure 11) a plurality of openings 160 in their central areas, formed between inwardly projecting legs 161, which terminate in ends 162, adapted to be received in ways or splines 163 in shaft 49. The central portions of the rotors, including the surfaces of the legs 161 are recessed inwardly a substantial distance from the milling faces 164 and are connected thereto by inclined or conical wall sections 165. The pitch of the incline 165 between surfaces 161 and 164 is relatively steep. A plurality of milling grooves 167, referred to above in connection with stator 143 as grooves 145, are formed in the other milling discs. Also the milling faces of the rotors 154 and 155 are provided with ribs and grooves or serrations 168, similar to those shown at 146 on the face of stator 143. These serrations preferably take the form of narrow, shallow, closely spaced grooves cut on intersecting circles having their centers on the circumference of a circle 169 concentric with the circular outer edge of the rotors.

The bottoms of the milling grooves 167 extend at their inner ends from the plane of the inner edge of the inclined or conical surface 165, which coincide with the plane of the faces of the legs 161 outwardly on an arc of long radius to the plane of the face 164. They are disposed on straight lines arranged in angular relation to radii of the discs and are pitched outwardly and forwardly relative to the direction of rotation, on both faces of the rotor discs 154 and 155.

The stator disc 156 (Figure 10) is similarly formed, with an inclined beveled or conical section 170 on both faces between the milling surfaces 171 and the central opening 172. The milling faces are provided with circular grooves 168' identically arranged to grooves 168 on the rotor faces. However, the outwardly extending shearing or milling grooves 173 are pitched in the opposite direction, as compared to the shearing grooves 167 formed in the faces of the rotors.

The end stator disc 157 has its inner milling face configurated identically to the corresponding faces of stators 143 and 156. However, the central recess 174 does not extend all the way through the plate. Both stator discs 157 and 156 are provided with projections or keys 157' and 156', adapted to be received in the grooves 152 and 153 to prevent rotation of the discs. Also their peripheries are provided with flats 156a and 157a to establish intercommunication between the annular chambers which receive the ground material, between the inner surface of the chamber 148 and the peripheries of the rotors 154 and 155, which chambers, of course, deliver material into the lateral enlargement or passage 149.

An important detail of construction of the milling discs is the relative disposition of the milling or shearing grooves 167 on the rotor discs and the grooves 173 on the stator discs and their cross-sectional shapes. Grooves 145 on stator 143 are identical to grooves 173. As pointed out above, the shearing grooves are oppositely pitched on the rotors and stators with respect to each other. Hence, material forced into the grooves from the openings adjacent the central portions is subjected to a shearing action by the edges of the grooves as they move over each other during rotation of the rotors. It will be understood that the pitch of the grooves on both faces of both rotors is the same and that the pitch of the grooves on all surfaces of the stators is the same but is opposite to that of the rotor grooves. Hence, the shearing action is effective between all relatively moving surfaces. Considering the walls of each groove as the active milling agent, it is apparent that, if the rotor in Figure 11 rotates in the counterclockwise direction, the edges 167' will be the active shearing edges and will cooperate, in the milling operation with edges 173' of the stator 156 shown in Figure 10, only on the opposite face thereof. The opposite edges of the grooves will perform substantially no shearing action. An important feature of the invention is that these non-shearing edges are relieved, inclined or cut back, as indicated at 167" and 173".

The rotor 154 in Figures 11 and 12 is adapted to rotate in the countereclockwise direction as indicated by the arrows. Figure 14 is a fragmentary view showing the relationship between one milling groove on a rotor and a cooperating groove on the stator. The rotor 154 moves in the direction of the arrow. Thus, the forwardly facing edge 167' of each groove, considered from the point of view of the direction of rotation, is abrupt, square to the disc surface and sharp, while the rearwardly facing edge 167" of each groove is inclined or relieved, making an obtuse angle to the disc surface. The grooves in the stator 156 are oppositely formed, with the edges 173' facing rearwardly toward the oncoming rotor being sharp and square to the stator surface and the edges 173" facing forwardly being relieved and disposed at an obtuse angle with respect to the surface. The advantages and resulting functions from this specific construction will be described below.

Referring again to Figures 8 and 9, the outer cover plate 151, carried by rods 104, has a forwardly projecting hollow, externally threaded boss 175 projecting therefrom. Disposed within the boss is a cylindrical plug 176 having an outwardly projecting flange 177 at its inner end, bearing against the outer face of the end stator disc 157. The outer end of the plug 176 is recessed, to receive the inner race of a thrust bearing assembly indicated generally at 178. A pressure adjusting cap 179 is threaded upon the boss of 175 with its inner face bearing against the thrust bearing assembly 178. A plurality of outwardly projecting handles 180 are formed on the cap, so that it may be rotated, to apply more or less pressure upon the end stator disc 157 and to control the spacing between the several milling discs. A packing seal 181 is provided between the plates 150 and 151, and the plug 176.

It will be understood, as mentioned above, that the right hand milling head is preferably substantially identical to the left hand one, just described.

Cooling system

As mentioned at the outset of this specification, an important object of the invention is to prevent overheating of the material being treated and to provide positive cooling means for the material and at least certain of the conduits through which the material passes. In most cases, it has been found satisfactory simply to positively cool, by the circulation of a cooling liquid, the back plate castings 25 and 26. By maintaining these large heavy members in a cooled state, heat from the active, friction producing parts, such as the driving gears, the elements of the gear pumps and the milling discs, is readily absorbed by conduction through the metal plates, rods, shafts and the like. The material being treated passes through these back plates three times during its treatment, once when being fed to the apparatus, again when being delivered from the first milling head to the second, and again when being discharged. These three passes through water cooled conduits contribute very substantially in preventing overheating.

If desired, cooling water may be circulated through passages formed in the plates 125, 128, 131, 141, 143, 147 and 150, through appropriate openings and channels, described below, but in actual practice, when working with such material as fresh, ripe, sweet corn kernels, such circulation has been found to be unnecessary and the trouble of providing adequate seals between the various openings, grooves and passages has been found to out-weigh the theoretical advantage which positive cooling provides. However, in special cases where other materials are being handled and where positive cooling is desirable, the features now to be described may be employed, together with appropriately shaped and apertured gasket sheets interposed between the successive plates, housings, etc. to solve the sealing problem. Moreover, in any case, the passages, holes, bores and the like, described below, are provided, since they are advantageous in reducing the weight of the parts.

The back plate casting 26 may be provided with an opening 200 communicating with the water jacket space 95 therebehind. As best shown in Figure 9, opening 200 registers with a hole 201 in plate 125. This opening is in communication with groove 202 on the outer face of the plate, which registers with an opening 203 in plate 128. The latter registers, similarly, with a bore or hole 204 in the pump housing plate 131. This bore in turn is in registry with a passage 205 in the plate 141 and the latter is in alignment with a bore 206 in the first stator disc plate 143. Hole 206 registers with a laterally enlarged water jacket space 207 in the mill housing 147. The outer end of this space registers with an opening 208 in the milling chamber outer end sealing plate 150 and the latter communicates through a groove in the outer face of the latter plate with an opening 209 in said plate. This opening leads the water back through another water jacket space 210 in the mill housing 147. The latter registers with an opening 211, which may extend all the way through the plate 143 or simply be in the form of a recess, since the fluid flows therefrom through a groove 212 in the outer face of stator plate 143 to another recess or opening 213 in the same plate. This opening is in registry with still another jacket passage 214 in the mill housing 147. The fluid is again transferred by openings 215, groove 216 and passage 217 in end sealing plate 150, from which point it flows rearwardly again through the water jacket passage 218 in the mill housing 147. From the inner end of this passage, the fluid flows back through plates 143, 141, 131, 128 and 125, by way of openings 219, 220, 221, 222, 223 therein, respectively. The opening 223 in the latter plate is at one end of a recess 224 which leads downwardly to another opening 225 in the same plate. The latter delivers the fluid for forward flow through passages 226, 227, 228, 229, 230 and 231 in the entire series of plates and housings. From the opening 231 in end sealing plate 150, the fluid flows through a groove in the outer face thereof to an opening 232, from which point it flows rearwardly again through a passage 233 in mill housing, and a hole 234 in plate 143 to an opening 235 in the pump cylinder front plate 141. The opening 235 is in communication through a channel 236 with another opening 237 in plate 141.

From this opening 237 in plate 141, the cooling liquid is free to circulate by convection currents, or the like, through relatively large openings 238, 239 and 240 in plates 131, 128, and 125. Also, from opening 237 in plate 141, it flows on an independent path to the water discharge opening in the back plate casting, along a circuitous route, now to be described. The flow is forwardly through opening 238' in the first stator plate 143, next through passage 239' in the mill housing 147 and then through opening 240' in the front stator plate 150. The latter has a transversely extending groove 241' in its outer face, leading to an opening 242', through which the water flows rearwardly again, through passages 243' in the mill housing 147 and through an opening 244' in the back stator plate 143. The latter opening is in registry with an opening 245' in plate 141, from which the water may circulate by convection into an opening 245" in the pump housing 131. However, the principal flow from opening 245' is through a transverse groove 246' in the face of plate 141 to an opening 247' therethrough. From this opening, the liquid flows rearwardly again through a passage 248' in the pump housing 131 and thence through an opening 249' in plate 128 to a groove 250' in the face of the back sealing plate 125. The latter groove communicates with an enlarged opening 251' having a portion in registry with the discharge opening 252' in the back plate casting 25.

When this circulating system is employed it is desirable to have the upper water jacket spaces 94 and 95 out of communication with the lower spaces 97 and 96, so that the water delivered to the upper spaces under pressure is forced to flow through the milling head and pump housings along the circuitous route described above, back to the lower chamber for discharge.

Discharge of milled material

It will be understood, as explained below, in connection with the operation of the apparatus, that the material being milled flows outwardly through the spaces between the faces of the rotors 154 and 155 and the adjacent stator plates, into the spaces surrounding the rotors and into the lateral enlargement 149 in the mill housing 147. The front end of this passage 149 is closed by the outer end sealing plate 150. The inner end, however, communicates with an opening 181 in the first stator milling disc 143 and the latter is in alignment and delivers to openings in plates 141, 131, 128, 125, indicated, respectively, at 182, 183, 184 and 185. The latter opening registers with the opening 106 in the back plate casting 25 which, as explained above, communicates through conduit 107 with the right hand back plate casting 26.

Pressure control

As shown in Figure 1, the front face of the upstanding gear housing 19 carries a pair of pressure gauges 300 and 301, to measure the pressure being exerted on the material as it is forced between the milling discs. As pointed out above, the back plate castings 25 and 26 are provided with openings 105 and 105' adapted to receive conventional pressure responsive bellows operatively connected to these gauges in any appropriate manner, as by flexible conduits 300' and 301'. It should be noted that the back sealing plate 125 (Figure 9) is provided with an opening 302, registering with the opening 105 and that the pump housing back plate 128 is provided with a registering opening 303. These openings are all in direct alignment and communication with the discharge chamber 139 of the gear pump. It will be remembered that the material flows from this chamber forwardly to the central openings in the milling rotors and stators. Hence, by gauging the pressure existing in this chamber, the pressure exerted on the material being forced through the milling surfaces is determined. A small quantity of the material, of course, fills the openings 303, 302, and 105 and transmits pressure to the pressure responsive bellows. Thus the gauges 300 and 301 register the pressure in the milling chamber.

Operation

Although the mill of the present invention is adapted to operate upon a wide variety of different materials, it has been designed primarily, as indicated above, for reducing fresh corn kernels to a fluid state, to form the creamy constituent of cream style canned corn. Hence, the operation of the apparatus will be described in connection with the treatment of such material.

Freshly cut kernels from green sweet corn are fed by any appropriate means into the hopper 24a of the screw conveyor disposed within the housing 24, from which they are delivered by the spout 68 to the inlet 91 of the left hand back plate 25. The screw conveyor serves to compact and somewhat compress the corn kernels, and to exclude substantially all of the air in the spaces between the kernels and therefore can be referred to as a "compacter." Hence, the kernels are fed as a compact mass of particles through the opening 93 in the back plate and the registering openings in the next two plates to the gear pump inlet chamber 138. The gears rotate in the direction of the arrows in Figure 9 so that the space between each pair of teeth in each gear receives corn fed thereto under pressure and carries the same around in the pump chamber 132 and 133 to the discharge chamber 139. Here, the teeth of one gear enter into the spaces between the teeth of the other gear and vice versa, thereby forcing the corn out of those spaces and into the discharge chamber 39 by a known positive displacement action. Under the force of the gear pump, the corn flows forwardly through opening 140 in the pump front plate 141 and laterally through recess 142, the lower end of which is concentric to the lower shaft 49 and the milling discs mounted on and surrounding the same. It will be noted that the first stator disc 143 has an enlarged central opening 144 to receive the corn. The rotor disc 154 similarly has four openings 160 to receive corn by longitudinal flow from the opening 144. The first floating stator plate 156 has a central opening 172 corresponding to the opening 144 in plate 143, and this opening 172 receives material from the openings 160 in the rotor. The next rotor has a similar series of four openings, through which the material may flow from opening 172, and the last floating stator plate 157 has a central recess 174 registering therewith. Hence, all of the openings in the milling plates are normally filled with material, forcefully delivered thereto from the discharge chamber of the gear pump. The material is forced outwardly into the grooves 167 and 173 of the rotor and stator discs respectively. As the rotor discs move relative to the stator, there is a shearing action, as described above, between the edges of the abrupt walls 167' and 173'. This shearing action tends to force the sheared material toward the bottom of the grooves and laterally along the inclined edges 167" and 173", as well as outwardly toward the outer ends of the grooves along the arcuate inclined bottoms thereof. When sufficiently reduced in size, the sheared and milled corn passes through the spaces between the rotor and stator discs and more particularly through and over the circular grooves 168 and 168' formed in the milling surfaces of the discs where it is further reduced in size and converted to a creamy fluid. The material is received in the discharge passage 149 in the mill housing 147, for flow through discharge openings 181, 182, 183, 184, and 185 in the plates 143, 141, 131, 128 and 125 respectively.

The degree of fineness of the grind produced in the first milling head and the pressure required to force the corn through the mill may be determined by adjusting the threaded cap 179 on the boss 178 of the outer cover plate 151. Preferably, the boss is calibrated, and the cylindrical body of the cap carries a pointer so that the adjusted position may be read. It will be apparent that, by backing off the cap 179, the space between the rotors and the stators will be increased, since the stators 156 and 157 and rotors 154 and 155 are free to move longitudinally in the mill housing. Such adjustment reduces the pressure required to force the corn through the mill and the degree of fineness of the grind. Conversely, when the cap 179 is screwed up, the space between the discs is decreased, the pressure requirements are increased, and the degree of fineness of the grind is increased.

The material is delivered from the discharge opening 106 in the back plate casting 125 to the other back plate casting 26 where it is again delivered to the second positive displacement gear pump and forced through the second milling head in substantially the same manner, except that the fineness of the grind or the degree of reduction is greater in the second milling head. The creamy liquid material is discharged from the machine through the opening 108', which is preferably connected to a suitable conduit for conveying the material to the next point in the cannery.

An important feature in the operation of this machine is the cooling of the material being treated, at least three times during its passage through the apparatus; first during its movement through the water cooled inlet passage 91 in the back plate casting 25; second, during its transfer from the first milling head to the second, in the water cooled passages 107 and 120 in back plate castings 25 and 26; and finally during its movement through the discharge passage 107' in back plate casting 26. This positive cooling of the material makes it possible to increase the production of the mill very substantially without overheating.

Another important feature of the operation of the apparatus is the treatment of only very small quantities of material simultaneously at any one time, which is effected by the high speed passage of the material along a plurality of parallel paths between the milling surfaces in a minimum of time. This high speed milling operation is accomplished by the force feed of the material between the milling surfaces and not by increasing the speed of rotation of the rotors, which is maintained at a low range, such as 600 r.p.m. Thus, the generation of heat and an undue rise in temperature in the material being treated is avoided.

Although the invention has been described with considerable particularity by reference to the modification shown in the accompanying drawings, it will thus be understood that it is not limited to the details of construction shown and described, but includes all modifications coming within the scope of the appended claims and their equivalents.

I claim:

1. An apparatus for grinding comprising a pair of upright back plate castings disposed in side-by-side relation and having water jacket spaces therein, a pair of disc mill and force pump assemblies carried by and projecting forwardly from said castings, a conduit for material to be ground formed in the first of said castings and leading to the first assembly, another conduit formed in said castings leading from the first assembly to the second assembly, and a third conduit formed in the second of said castings leading from the second assembly for discharge of milled material, each of said conduits being in heat exchange relation to the water jacket spaces in the castings, and means for positively circulating cooling water through said spaces.

2. An apparatus for grinding, comprising a pair of disc mills, each including a cylindrical milling chamber having a lateral enlargement in its side wall, a fixed stator disc at one end of said chamber having a central inlet opening therein, a shaft extending into the chamber through said opening, a rotor disc splined on the shaft in face-to-face relation to said stator disc, means for delivering material to be ground through the inlet opening of the first disc mill under pressure for movement between the faces of the rotor and stator discs thereof outwardly to its enlargement, and means for conducting the material therefrom to the central inlet opening of the second disc mill under pressure for movement between the faces of the rotor and stator discs thereof outwardly into the lateral enlargement of the second mill, for discharge therefrom.

3. An apparatus for grinding comprising a housing having a cylindrical milling chamber therein, a fixed stator disc at one end of the chamber having a central inlet opening, a shaft extending into the chamber through said opening, a longitudinally floating stator disc in the chamber beyond the first stator disc, a longitudinally adjustable, normally fixed end stator disc at the other end of the chamber, a pair of longitudinally movable rotor discs splined on the shaft in face-to-face relation to the stator, means for delivering material to be ground through said inlet opening under pressure for movement between the rotor and stator disc faces outwardly beyond the rotor discs for discharge, and means for adjusting the position of the second end stator disc, to control the clearance between the rotor and stator discs and the degree of fineness of grind.

4. A combined force pump and milling assembly comprising a plurality of plate-like elements disposed in face-to-face relation and having openings and recesses therein shaped to provide spaced shaft openings, a gear pump chamber, a milling chamber, an inlet conduit leading to the pump chamber, a pump delivery and milling chamber inlet conduit and a milling chamber delivery conduit; a pair of parallel rotatable shafts extending through the shaft openings into the pump chamber, intermeshing positive displacement pump elements on the shafts in the pump chamber, one of the shafts being extended into the milling chamber, stator milling means in the milling chamber, and rotor milling means on said shaft in said milling chamber disposed in cooperating relation to the stator milling means and providing a milling path between the milling chamber inlet and delivery conduits.

5. A combined force pump and milling assembly comprising a plurality of plate-like elements disposed in face-to-face relation and having openings and recesses therein shaped to provide spaced shaft openings, a gear pump chamber, a milling chamber, an inlet conduit leading to the pump chamber, a pump delivery and milling chamber inlet and a milling chamber delivery conduit; a pair of parallel rotatable shafts extending through the shaft openings into the pump chamber, intermeshing positive displacement pump elements on the shafts in the pump chamber, one of the shafts being extended into the milling chamber, a fixed stator at one end of the milling chamber, an intermediate stator therein and another stator at the other end of the milling chamber, a pair of rotors on the last mentioned shaft between the end and intermediate stators disposed in cooperating relation with respect thereto and providing a plurality of parallel milling paths between the milling chamber inlet and delivery conduits.

6. An apparatus for grinding comprising a pair of disc mill and force feed pump assemblies disposed in side-by-side relation and interconnected for series treatment of material to be ground and including conduit means delivering material to the first force feed pump, from the latter to the first disc mill, from the latter to the second force feed pump and therefrom to the second disc mill, characterized in that each mill comprises a fixed stator, an intermediate longitudinally floating stator, a normally fixed, longitudinally adjustable end stator and a pair of rotors between the end and intermediate stators, and means for adjusting the position of each end stator to determine the clearance between the discs, whereby the first mill may perform a preliminary grinding operation and the second mill, a further final grinding.

7. An apparatus in accordance with claim 6 characterized in that said conduit means includes three water jacketed portions with means for circulating cooling water therethrough, to cool the material being ground before, between, and after the two milling operations.

8. Apparatus for grinding comprising supporting means having water jacket spaces therein, a pair of disc mill and force pump assemblies carried by and projecting forwardly from said supporting means, said supporting means having formed therein a first conduit for material to be ground leading to the first assembly, a second conduit leading from the first assembly to the second assembly, and a third conduit leading from said second assembly for discharge of milled material, each of said conduits being in heat exchange relation to the water jacket spaces in said supporting means, said water jacket spaces being arranged to have a cooling water positively circulated therethrough whereby the material is cooled by the cooling water prior to, between, and after passage through said assemblies.

9. An apparatus for grinding comprising housing means defining a cylindrical milling chamber therein, a fixed stator disc at one end of the chamber having a central inlet opening, an imperforate normally fixed stator disc mounted at the other end of said chamber for longitudinal adjustment, a shaft extending through said inlet opening into said chamber and terminating short of said imperforate stator disc, rotor disc means splined on said shaft for longitudinal movement within said chamber between said stator discs in face-to-face cooperating relation thereto, means for delivering material to be ground through said inlet opening under pressure for movement between the cooperating faces of said stator discs and rotor disc means outwardly beyond the latter for discharge, and means for adjusting the position of said imperforate end stator to control the clearance between the cooperating faces of said stator discs and said rotor disc means and hence the degree of fineness of grind.

10. A combined force pump and milling assembly comprising means defining a pair of spaced shaft openings, a gear pump chamber, a milling chamber, an inlet conduit leading to the pump chamber, a pump delivery and milling chamber inlet conduit and a milling chamber delivery conduit; a pair of parallel rotatable shafts extending through the shaft openings into the pump chamber; intermeshing positive displacement gear pump elements on the shafts in said pump chamber, one of said shafts being extended into said milling chamber; stator milling means in said milling chamber; and rotor milling means on said one shaft in said milling chamber disposed in cooperating relation to said stator milling means and providing therewith a milling path between said milling chamber inlet and delivery conduits.

11. An apparatus for grinding corn and the like comprising a housing having a generally cylindrical chamber therein and a receiving conduit connected thereto, a pump in said receiving conduit, said pump having an intake means, a compacter operatively connected to said pump intake means, a grinding means in said chamber, said grinding means comprising a stator and a cooperating rotor having opposed grinding means thereon, said grinding means having centrally aligned openings for reception of material to be ground, and said housing having a conduit therethrough extending from said chamber outwardly, said last mentioned conduit serving to conduct ground material outwardly from said grinding means.

12. An apparatus for grinding corn and the like so as to reduce the same into the cream constituent of creamed corn comprising a compacter for receiving cut corn kernels and reducing the same into a compacted mass and means receiving the compacted mass from said compacter for reducing the compacted mass into a finely divided mass having the desired particle size of the cream constituent by grinding under pressure successive small quantities of the compacted mass, said means comprising a housing having a first generally cylindrical chamber therein and a receiving conduit connected thereto, a pump in said receiving conduit, said pump having an intake means operatively connected to said compacter, a first grinding means in said chamber, said first grinding means comprising a stator and a cooperating rotor having opposed grinding means thereon, said first grinding means having centrally aligned openings for reception of the compacted mass to be ground, said housing having a conduit therethrough extending from said chamber outwardly, said last-mentioned conduit serving to conduct ground material outwardly from said first grinding means, the opposed grinding means of said first grinding means being operable to grind successive small quantities of the compacted mass fed under pressure therethrough by said pump so as to reduce the compacted mass into an initial finely divided mass having a particle size greater than the desired particle size of the cream constituent, means defining a second generally cylindrical chamber operatively connected with said last-mentioned conduit, a second grinding means in said second chamber, said second grinding means comprising a stator and a cooperating rotor having opposed grinding means thereon, said second grinding means having aligned openings for reception of the initial finely divided mass, and discharge means extending outwardly from said second chamber, the opposed grinding means of said second grinding means being operable to grind successive small quantities of the initial finely divided mass under pressure so as to reduce the initial finely divided mass into a finely divided mass having the desired particle size of the cream constituent.

13. Apparatus as defined in claim 12 wherein a second pump is operatively connected between said last-mentioned conduit and said second chamber.

14. Apparatus as defined in claim 13 including means for circulating a cooling fluid in heat absorbing relation to the corn kernels being reduced during their movement from said pump to said discharge means.

References Cited in the file of this patent
UNITED STATES PATENTS

| | | |
|---|---|---|
| 633,135 | Hardt | Sept. 19, 1899 |
| 1,009,021 | Bryant | Nov. 14, 1911 |
| 1,109,361 | Reynolds | Sept. 1, 1914 |
| 1,182,967 | Bowser | May 16, 1916 |
| 1,666,640 | Cunniff | Apr. 17, 1928 |
| 1,831,049 | Treschow | Nov. 10, 1931 |
| 1,956,293 | Klein et al. | Apr. 24, 1934 |
| 2,090,650 | Vant | Aug. 24, 1937 |
| 2,115,123 | Russell | Apr. 26, 1938 |
| 2,176,892 | Dotzer et al. | Oct. 24, 1939 |
| 2,211,518 | Scherbaum | Aug. 13, 1940 |
| 2,412,680 | Fisher et al. | Dec. 17, 1946 |
| 2,437,147 | Zwoyer | Mar. 2, 1948 |
| 2,572,373 | Niethamer | Oct. 23, 1951 |
| 2,659,314 | Wood | Nov. 17, 1953 |
| 2,672,100 | Harvey | Mar. 16, 1954 |